(12) United States Patent
Peinelt et al.

(10) Patent No.: US 8,561,464 B2
(45) Date of Patent: Oct. 22, 2013

(54) METHOD AND DEVICE FOR UNBALANCE CORRECTION ON A VEHICLE WHEEL

(75) Inventors: Andreas Peinelt, Pfungstadt (DE); Wilhelm Weyrich, Bad Koenig (DE)

(73) Assignee: Schenck RoTec GmbH, Darmstadt (DE)

( * ) Notice: Subject to any disclaimer, the term of this patent is extended or adjusted under 35 U.S.C. 154(b) by 276 days.

(21) Appl. No.: 12/931,297

(22) Filed: Jan. 28, 2011

(65) Prior Publication Data

US 2011/0197672 A1 Aug. 18, 2011

(30) Foreign Application Priority Data

Feb. 16, 2010 (DE) .......................... 10 2010 002 002

(51) Int. Cl.
*G01M 1/16* (2006.01)

(52) U.S. Cl.
USPC .......................................... 73/470; 301/5.21

(58) Field of Classification Search
USPC ............ 73/470, 468, 462, 459, 469; 301/5.21
See application file for complete search history.

(56) References Cited

U.S. PATENT DOCUMENTS

| | | | | |
|---|---|---|---|---|
| 1,130,210 A * | 3/1915 | Spence | ........................ | 451/343 |
| 4,547,945 A * | 10/1985 | Lawson | ..................... | 29/407.05 |
| 5,048,173 A * | 9/1991 | Miller | ............................. | 29/450 |
| 5,134,766 A * | 8/1992 | Miller | ............................. | 29/450 |
| 5,365,786 A * | 11/1994 | Douglas | ........................ | 73/462 |
| 6,244,108 B1 * | 6/2001 | McInnes et al. | ................ | 73/462 |
| 7,353,701 B2 * | 4/2008 | Pellerin et al. | ................. | 73/146 |
| 7,448,267 B2 * | 11/2008 | Williams et al. | ................ | 73/462 |
| 7,478,659 B2 * | 1/2009 | Jeon | ............................. | 156/358 |
| 7,684,027 B2 * | 3/2010 | Douglas et al. | ............... | 356/155 |
| 7,882,738 B2 * | 2/2011 | Carpenter et al. | .............. | 73/460 |
| 8,061,200 B2 * | 11/2011 | Douglas | ......................... | 73/459 |
| 8,161,650 B2 * | 4/2012 | Lawson et al. | ............ | 29/894.31 |
| 8,182,639 B2 * | 5/2012 | Donnay et al. | ................ | 156/281 |
| 2002/0152811 A1 | 10/2002 | Gross et al. | | |
| 2005/0229702 A1 * | 10/2005 | Haydu | ........................... | 73/468 |

(Continued)

FOREIGN PATENT DOCUMENTS

DE      199 22 085      12/2000
DE  10 2007 014 461      7/2008

(Continued)

*Primary Examiner* — Peter MacChiarolo
*Assistant Examiner* — Samir M Shah
(74) *Attorney, Agent, or Firm* — Collard & Roe, P.C.

(57) ABSTRACT

Disclosed is a method for correcting an unbalance on a vehicle wheel including a rim and a tire, which includes measuring the unbalance of the vehicle wheel in an unbalance measuring station, rotating the vehicle wheel in the unbalance measuring station into a defined angular position and transmitting the defined angular position and the correction data to a control device for controlling an applicator head of a balancing station, transferring the vehicle wheel from the unbalance measuring station to the balancing station by means of a gripper arranged on a handling device and centrally locating and holding it in the balancing station, loading a corrective element which has one side coated with an adhesive and exhibits the weight amount determined in the unbalance measuring station into the applicator head of the balancing station, and rotating the vehicle wheel and/or the applicator head in dependence upon the control device in such a way that the corrective element in the cavity of the wheel rim reaches the correction plane and the attachment location on the attachment surface, and fastening the corrective element by pressing its adhesive-coated side against the attachment surface of the rim.

17 Claims, 7 Drawing Sheets

(56) References Cited

U.S. PATENT DOCUMENTS

| | | | |
|---|---|---|---|
| 2006/0016258 A1* | 1/2006 | Williams et al. | 73/462 |
| 2007/0144681 A1* | 6/2007 | Cunningham | 157/1.24 |
| 2007/0175275 A1* | 8/2007 | Carpenter et al. | 73/460 |
| 2008/0150348 A1* | 6/2008 | Douglas et al. | 301/5.21 |
| 2008/0196496 A1* | 8/2008 | Jablonski et al. | 73/462 |
| 2008/0277072 A1* | 11/2008 | Hagiwara | 157/1.17 |
| 2009/0084506 A1* | 4/2009 | Lawson et al. | 157/1.1 |
| 2010/0058859 A1 | 3/2010 | Rogalla et al. | |
| 2010/0095767 A1* | 4/2010 | Douglas | 73/459 |
| 2010/0147458 A1* | 6/2010 | Donnay et al. | 156/281 |

FOREIGN PATENT DOCUMENTS

| | | |
|---|---|---|
| DE | 20 2008 002 258 | 7/2009 |
| EP | 1 132 729 | 9/2001 |
| JP | 05-107144 | 4/1993 |

* cited by examiner

METHOD AND DEVICE FOR UNBALANCE CORRECTION ON A VEHICLE WHEEL

CROSS-REFERENCE TO RELATED APPLICATIONS

Applicants claim priority under 35 U.S.C. §119 of German Patent Application No. 10 2010 002 002.8 filed Feb. 16, 2010.

FIELD OF THE INVENTION

This invention relates to a method and a device for correcting an unbalance on a vehicle wheel including a rim and a tire, by adhesive-bonding at least one corrective element to an attachment surface of the rim.

DESCRIPTION OF PRIOR ART

A method and a device of the type referred to are known from JP 05 107 144A. According to the known method, the vehicle wheel, following its assembly, is transferred to an unbalance measuring station where amount of weight and attachment location for the corrective element are determined. The items of data are transmitted to a control device which controls a device for manufacturing and attaching a suitable corrective element. During the time the corrective element is severed from a material web and coated with a double-sided adhesive tape, the vehicle wheel is held on the screw-down surface of the rim by a transfer robot and transferred from the unbalance measuring station to a balancing station where the wheel is held clamped in a vertical position in such a way that the attachment position for the corrective element is at a defined location. An applicator robot of the balancing station grips the prepared corrective element by turning a drill into the corrective element, transfers it to the holder and adheres it to the outside or, in a split configuration, to the outside and the inside of the rim flange. The wheel with the corrective element attached to it is then transferred to an outgoing conveyor belt by means of the transfer robot.

The known method is intended for the attachment of corrective elements to the rim flange of vehicle wheels and not for the attachment of corrective elements in the interior of the rim cavity. The known method is configured for unbalance correction in only one plane and would require plenty of time for unbalance correction in two planes.

SUMMARY OF THE INVENTION

It is an object of the present invention to provide a method of the type initially referred to which enables a part-automatic or fully automatic unbalance correction within a short period of time in a process-reliable manner. Desirably, the method is suitable for unbalance correction in one or two planes. Moreover, it is an object of the present invention to provide an advantageous device for implementing the method.

According to the invention the method for correcting an unbalance on a vehicle wheel including a rim and a tire, by adhesive-bonding at least one corrective element to an attachment surface on the inside of the rim comprises the following steps:

Measuring the unbalance of the vehicle wheel in an unbalance measuring station and producing correction data indicative of the amount of weight and the attachment location of at least one corrective element relative to at least one correction plane, and a diameter of an attachment surface in the cavity of the rim;

rotating the vehicle wheel in the unbalance measuring station into a defined angular position and transmitting the defined angular position and the correction data to a control device for controlling an applicator head of a balancing station;

transferring the vehicle wheel from the unbalance measuring station to a balancing station by means of a gripper arranged on a handling device, which grips the tire of the vehicle wheel on its outside and centrally locates and holds the vehicle wheel in the balancing station, and transmitting the defined angular position of the vehicle wheel to the balancing station;

loading a corrective element which has one side coated with an adhesive and exhibits the weight amount determined in the unbalance measuring station into the applicator head of the balancing station;

axially moving the vehicle wheel and/or the applicator head and rotating the applicator head, each in dependence upon the control device, in such a way that the corrective element in the cavity of the wheel rim reaches the correction plane and the attachment location on the attachment surface, and fastening the corrective element by pressing its adhesive-coated side against the attachment surface of the rim; and transferring the balanced vehicle wheel from the balancing station to an outgoing conveyor unit for further transportation and handing-over the balanced vehicle wheel to the outgoing conveyor unit by the handling device.

In the method of the invention, the vehicle wheel is held on its outside on the tread of the tire by means of a gripper, which allows ease of handling and avoids disadvantages when mounting the wheel on the screw-down surface. As a result, the inner space in the rim dish affords free access to an applicator head holding also several corrective elements, so that with limited expenditure of time the applicator head is able to apply corrective elements in one or two correction planes by entering the rim dish only once. Another advantage of the method of the invention results from the fact that the vehicle wheel is held and centrally located in the balancing station by the handling device which obviates the need to provide additional holding devices. It is also possible for the axial relative movement of vehicle wheel and applicator head to be effected by axial movement of the gripper of the handling device when the handling device, for example, a multi-axis robot, possesses this movement function. In addition, the applicator head may be provided with an actuator enabling it to be positioned axially.

To be able to perform the balancing operation in two correction planes particularly easily and speedily, according to another aspect of the invention the applicator head includes two mounts for receiving corrective elements. The mounts may be axially spaced from each other by a distance corresponding to the relative distance of the correction planes. After the applicator head is axially positioned in the cavity of the vehicle wheel, it is thereby possible in a single step and, where applicable, without any further axial relocation of wheel or applicator head, to affix the selected corrective elements one after the other in each correction plane.

Another aspect of the invention provides that for unbalance correction a first balancing station with a first applicator head and a second balancing station with a second applicator head are used, wherein vehicle wheels to be balanced are transferred by the handling device in a continuous sequence alternately to the first and to the second balancing station and held in the respective balancing station during the balancing operation. The arrangement of two balancing stations enables the cycle time for the unbalance correction of vehicle wheels to be reduced considerably, because during the time the corrective elements are applied to a vehicle wheel in the one balancing station, the applicator head in the other balancing station may be loaded with corrective elements for the next sequential vehicle wheel just measured. Another possibility contributing to a reduced cycle time includes transferring the vehicle wheel from the unbalance measuring station to a transfer station while maintaining its defined angular position, centrally locating it in the transfer station, gripping it centrally by means of the gripper arranged on the handling device, and then transferring it from the transfer station to the balancing station. The arrangement of a transfer station enables a measured wheel to be removed from the unbalance measuring station earlier, independently of the operating cycle of the handling device, and to feed the next sequential vehicle wheel to the unbalance measuring station.

The time gained by the arrangement of two balancing stations also enables the use of balancing stations containing an assortment of corrective elements of different amounts of weight or types, with an operator using the correction data from the unbalance measuring station to select the corrective elements intended for the balancing operation and load them into the applicator head. For this purpose, the applicator head is moved into a secure operator working area. It will be understood that the method of the invention may also be implemented with balancing stations having assigned to them an automatic cutting device which, in dependence upon the correction data, severs suitable corrective elements from a material web, with the applicator head being moved up to the cutting device in a loading position for receiving a severed corrective element and for subsequent movement into the attaching position.

The method of the invention may be implemented by means of various handling devices. The handling device may be configured in such a way that the gripper, in transferring the vehicle wheel to the balancing station, performs a linear movement while the defined angular position adjusted in the unbalance measuring station is maintained during transfer to the balancing station. On the other hand, during transfer of the vehicle wheel to the balancing station, the handling device, for example, a robot with a pivotal arm, may execute a rotary movement about a vertical axis, with the rotation angle of the rotary movement being detected by the control device and used for computation of the location of the defined angular position in the balancing station.

According to another aspect of the invention, an advantageous device for implementing the method comprises an unbalance measuring station for measuring the unbalance of the vehicle wheel and for generating correction data indicative of the amount of weight and the attachment location of at least one corrective element relative to at least one correction plane and a diameter of an attachment surface in the cavity of the wheel rim, a handling device mounting a gripper for transferring the measured vehicle wheel to a balancing station, with the gripper being configured for gripping the tire of the vehicle wheel on its outside, and the handling device being configured for centrally locating and holding the vehicle wheel in the balancing station, and a device for transmitting the defined angular position and the correction data to a control device for controlling the balancing station, with the balancing station including an applicator head having a mount for receiving at least one corrective element, said applicator head being dimensioned to be able to enter into the cavity of the wheel rim, being rotatable into any attachment location on the attachment surface by means of a rotary drive mechanism controllable by the control device, and including a pressure-applying device actuatable by the control device for pressing the corrective element against the attachment surface of the wheel rim.

In the device of the invention, the vehicle wheel is positioned and held in the balancing station by means of the handling device, which enables the constructional expenditure for the balancing station to be reduced considerably. The handling device may also be configured for movement of the vehicle wheel relative to the applicator head in the axial direction in order to align it relative to the applicator head for both correction planes.

According to another embodiment of the invention it may be provided that the mount of the applicator head receiving the corrective elements is arranged on a carriage which is held in a straight-line guideway of a support member and movable along the straight-line guideway by a controllable actuator, with the straight-line guideway being aligned parallel to the axis of rotation of the applicator head. This arrangement makes it possible to move the mount for the corrective element on the applicator head into the appropriate correction plane while the vehicle wheel is held in a defined position by the handling device. Furthermore, this arrangement may serve to axially adjust the position of the mount relative to the vehicle wheel or relative to a second mount arranged on the applicator head.

Another embodiment of the invention may comprise the arrangement of a first mount for receiving at least one corrective element on the support member of the applicator head, and a second mount for receiving at least one corrective element on the opposite side relative to the axis of the first mount, with the mounts being movable by a pressure-applying device actuatable by the control device for pressing-on the corrective element. The arrangement of two mounts which are suitably spaced from each other in axial direction by a distance corresponding to the distance between the correction planes enables the corrective elements to be applied in both correction planes particularly easily and speedily, because only one axial positioning of the applicator head relative to the vehicle wheel is needed for both correction planes.

According to another proposal of the invention, the mount of the applicator head may include a curved wall with an edge area curved in a circular configuration and extending at a constant distance to the axis, with several radially aligned support plates being fastened to the inside of the edge area, said plates mounting for pivotal movement resilient clamping fingers, with a curved pressure-applying bar being arranged on the outside of the support plates facing away from the axis, said bar having on its outside a cylindrical engagement surface and adjacent thereto an outwardly projecting rib, and with the clamping fingers having their ends protrude outwardly beyond the curved pressure-applying bar such that their ends lie opposite the rib.

Furthermore, at one circumferential end of the curved pressure-applying bar, a two-armed clamping lever may be arranged which with one clamping end thereof lies opposite an outwardly projecting rib of the pressure-applying bar and is movable by a controllable reciprocating cylinder into a clamping position holding a corrective element and into a release position. The clamping lever is operable to grip a corrective element actively and hold it reliably on its transfer from a cutting device.

To reduce the cycle time, the device of the invention may further include two balancing stations both of which are located in the working range of the handling device. Moreover, a transfer station may be provided which is connected to the unbalance measuring station by a conveying device constructed to transfer a vehicle wheel from the unbalance measuring station to the transfer station without changing its angular position.

Still further, the device of the invention may include an automatic cutting device with a feeding unit for a material web, a severing unit which in dependence upon the correction data severs suitable corrective elements from the material web, with the applicator head being provided with a controllable motion device by means of which the applicator head is movable up to the cutting device for the insertion of severed corrective elements. This enables a fully automatic unbalance correction of vehicle wheels.

BRIEF DESCRIPTION OF THE DRAWINGS

The present invention will be explained in more detail in the following with reference to embodiments illustrated in the accompanying drawings. In the drawings.

DETAILED DESCRIPTION OF THE EMBODIMENTS

Figure 1:
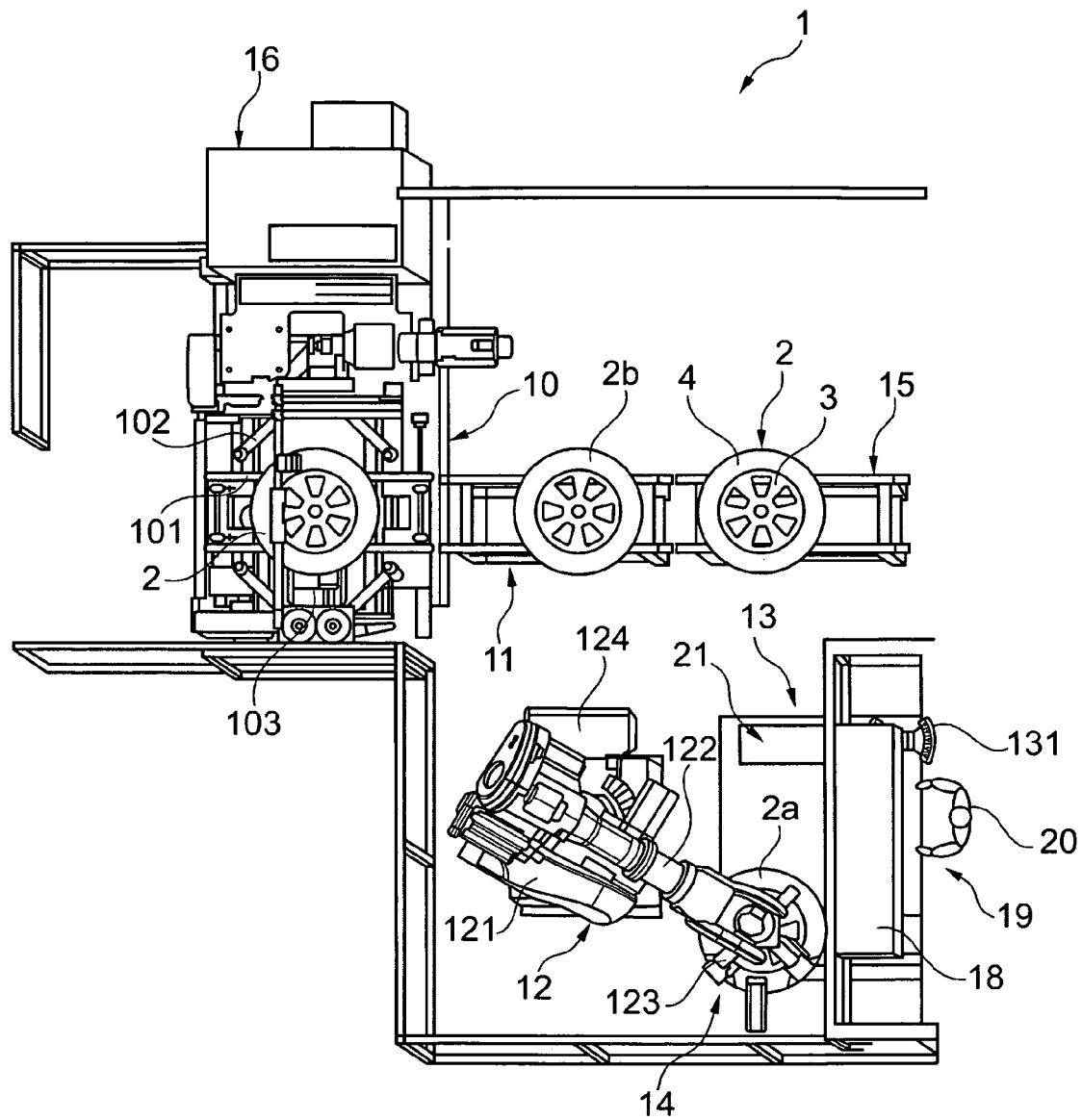
FIG. 1 is a view of an installation for correcting the unbalance of vehicle wheels using two semi-automatic balancing stations according to the invention.

The installation 1 shown in FIG. 1 is part of a production line for the manufacture of complete vehicle wheels 2 essentially comprised of a rim 3 and a tire 4 surrounding the rim 3. The vehicle wheels 2 are assembled in an assembly line and then fed to the installation 1 by means of a conveyor unit. The installation 1 comprises an unbalance measuring station 10, a transfer station 11, a handling device 12, two balancing stations 13, 14 and an outgoing conveyor unit 15. The unbalance measuring station 10 is the entry point of the installation. It is the place where the assembled vehicle wheels are fed in a lying position, with the outside of the vehicle wheels pointing upwards.

The unbalance measuring station 10 has in conventional manner a belt conveyor unit 101 for feeding and removing the vehicle wheels 2, locating devices 102, a motor-driven measuring spindle 103 with vertical axis and measuring devices, not shown, which detect the measurement values necessary to determine location and magnitude of the unbalance. Associated with the unbalance measuring station 10 is a central processing unit 16 which contains an evaluating circuitry for evaluating the measurement data and for generating correction data indicative of amount of weight and attachment location of the corrective elements to be applied for unbalance correction. The central processing unit 16 also contains control devices for controlling the unbalance measuring station 10 and further devices and stations of the installation.

For unbalance measurement, a vehicle wheel 2 fed to and centrally located in the unbalance measuring station 10 is received by the measuring spindle 103, accelerated to measuring rpm, decelerated, and after being rotated into a defined angular position, is moved by the belt conveyor unit 101 to the transfer station 11 while its angular position is maintained. At the same time, the measurement data obtained during the measuring run are processed by the evaluating circuitry of the central processing unit 16 which generates correction data for unbalance correction and transmits them to the balancing stations 13, 14. The fed vehicle wheel 2b is centrally located in the transfer station 11 and held available there for pick-up by the handling device 12.

In the installation shown in FIG. 1, the handling device 12 is an articulated-arm robot 121 rotary about a vertical axis and having a robot arm 122 which is pivotal about a horizontal axis and carries a four-armed gripper 123. The articulated-arm robot 121 is provided with a control device 124 linked to the central processing unit 16 and controlling the articulated-arm robot 121 in dependence upon the central processing unit 16. The construction of the handling device 12 is not limited to an articulated-arm robot. A portal-type gripper, for example, may be provided as substitute.

The balancing stations 13, 14 comprise an applicator head 131, described in more detail in the following, which includes mounts for receiving several corrective elements. The applicator head 131 is rotatable about a vertical axis into any attachment location by means of a controllable actuator. The corrective elements are loaded into the applicator head 131 at the balancing stations 13, 14 by an operator 20 who removes the corrective element intended for the respective balancing operation from a storage bin 18 containing an assortment of corrective element of various sizes. Loading the corrective elements into the applicator head 131 of the respective balancing station 13, 14 takes place alternately at one of the two balancing stations 13 or 14 at a time, while the other one of the two balancing stations 14 or 13 is in the process of attaching corrective elements to a vehicle wheel.

In the representation of FIG. 1, corrective elements are loaded at the balancing station 13. To this effect, the applicator head 131 of the balancing station 13 is moved on its carriage underneath the storage bin 18 into a secure working area 19 to enable the operator 20 to load the corrective elements into the applicator head 131 safely. The operator 20 reads the size of the corrective elements to be loaded from the correction data transmitted from the central processing unit 16 for the vehicle wheel 2b still held in the transfer station 11. The correction data are indicated to the operator 20 on a display. Following loading of the corrective elements, the operator 20 releases the applicator head 131 by pressing a key, thereby causing it to be moved into the working position 21 in the operating range of the handling device 12 on the rear side of the storage bin 18.

In the operating situation shown in FIG. 1, the handling device 12 holds a vehicle wheel 2a centrally located in the balancing station 14 while at the same time the applicator head of the balancing station 14 attaches corrective elements to the annular inner surface of the rim of the vehicle wheel 2a.

After the corrective elements are attached to the wheel 2a in the balancing station 14, the handling device 12 lifts the wheel 2a clear of the applicator head and deposits the wheel 2a on the outgoing conveyor unit 15 which in the operating situation shown in FIG. 1 has meanwhile moved the wheel 2 further on. After the wheel 2a is deposited, the handling device 12 moves the gripper 123 into a centric position on the transfer station 11 where it grips the vehicle wheel 2b centrically on the outer surface of the tire. The handling device 12 then moves the wheel 2b from the transfer station 11 to the balancing station 13, lowering it accurately centered onto the applicator head 131 so that the corrective elements held on the applicator head 131 are in the correction planes of the vehicle wheel. The pivot angle swept by the handling device 12 about its vertical axis in this process is transmitted by the control device 124 to the central processing unit 16. In calculating the angular positions of the applicator head 131 for affixing the corrective elements, the pivot angle is added to the defined angular position of the vehicle wheel 2b. The applicator head 131 performs in succession controlled movements into the calculated angular positions, and the corrective elements are adhesive-bonded to the vehicle wheel 2b. During this process, the applicator head 131 of the balancing station 14 is in the working area 19 of the operator 20 who may equip it with the corrective elements determined in the unbalance measuring station for the next sequential vehicle wheel.

Obviously, the installation 1 described and illustrated in FIG. 1 enables a semi-automatic unbalance correction to be achieved which, also in combination with the manual loading of the corrective elements, allows a short cycle time.

Figure 2:
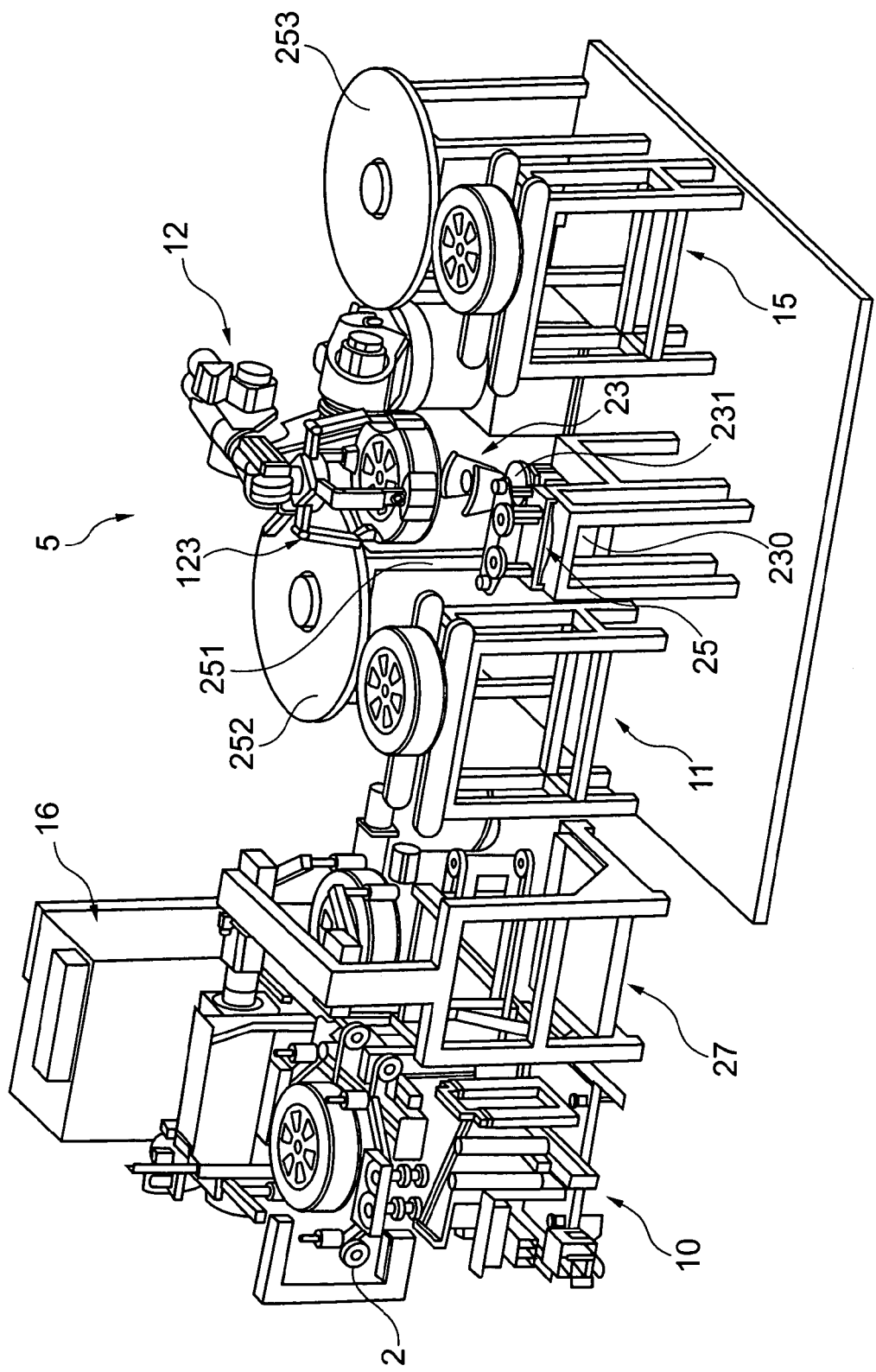
FIG. 2 is a view of a fully automatic installation for correcting the unbalance of vehicle wheels according to the invention.

FIG. 2 shows a fully automatic installation 5 for unbalance correction of vehicle wheels. The installation 5 comprises an unbalance measuring station 10, a transfer station 11, a handling device 12 with a gripper 123, a single balancing station 23 and an outgoing conveyor unit 15. Between the unbalance measuring station 10 and the transfer station 11, the installation 5 further includes a cleaning station 24 where the attachment surfaces for adhesive-bonding the corrective elements are cleaned to ensure better adhesion of the corrective elements.

The installation 5 has adjacent to the balancing station 23 an automatic cutting device 25 which, controlled by a central processing unit 16, produces corrective elements accurately cut to size in dependence upon the measured correction data and places them in an applicator head 231 of the balancing station 23. This process includes severing a suitable length of corrective element from a material web 251 which is unwound from a coil 252 and fed to the cutting device 25. Advantageously, the material web is rectangular in cross-section and made of a material of high density, for example, a metal alloy. One wide side of the material web 251 is provided with an adhesive layer. The adhesive layer is covered by a thin-walled protective-film strip which peels off easily from the adhesive layer. In the cutting device 25, the covering strip is removed from the material web 251, thereby exposing the adhesive layer on the severed corrective elements inserted into the applicator head 231 and enabling it to make contact with the attachment surface on the vehicle rim for attachment of the corrective elements.

To avoid downtime when the capacity of the coil 252 is exhausted, the cutting device 25 is constructed in such a way that the material web 251 may also be fed and processed by a second coil 253. In this way it is possible to change from one coil to the other without any notable interruption of operation, and sufficient time is left to replace a spent coil.

The applicator head 231 of the balancing station 23 is arranged on a powered carriage 230 whose movement is controlled by the central processing unit 16. The carriage 230 is operable to approach the applicator head 231 sufficiently close to the cutting device 25 to enable the cutting device 25 to load the corrective elements into the mounts of the applicator head 231. During loading the applicator head 231 is at the same time rotated about its axis to ensure that also relatively long corrective elements are evenly inserted into the mount of the applicator head 231 along their full length, resting with their rear surface against the applicator head. Following insertion of the corrective elements, the carriage 230 returns the applicator head to the initial position provided for application of the corrective elements, which is accessed by the handling device 12 carrying the vehicle wheel to be balanced.

In operation of the installation 5 shown in FIG. 2, the vehicle wheels 2 are fed to the unbalance measuring station 10 for measurement there and are then conveyed in a defined angular position to the cleaning station 24 and onward to the transfer station 11. At the same time, the central processing unit 16 computes the correction data in dependence upon which the cutting device 25 and the applicator head 231 are controlled in such a way that corrective elements of appropriate size are inserted in the applicator head 231. The handling device 12 then picks up the vehicle wheel from the transfer station 11, moving it above the applicator head 231 into the position provided for attachment of the corrective elements. The applicator head 231 is then rotated into the appropriate attachment position, and the respective corrective element is pressed against the attachment surface of the vehicle wheel by a radial movement of the applicator head 231. The handling device 12 then deposits the vehicle wheel on the outgoing conveyor unit 15 and is ready to pick up the next vehicle wheel from the transfer station 11.

Figure 3:
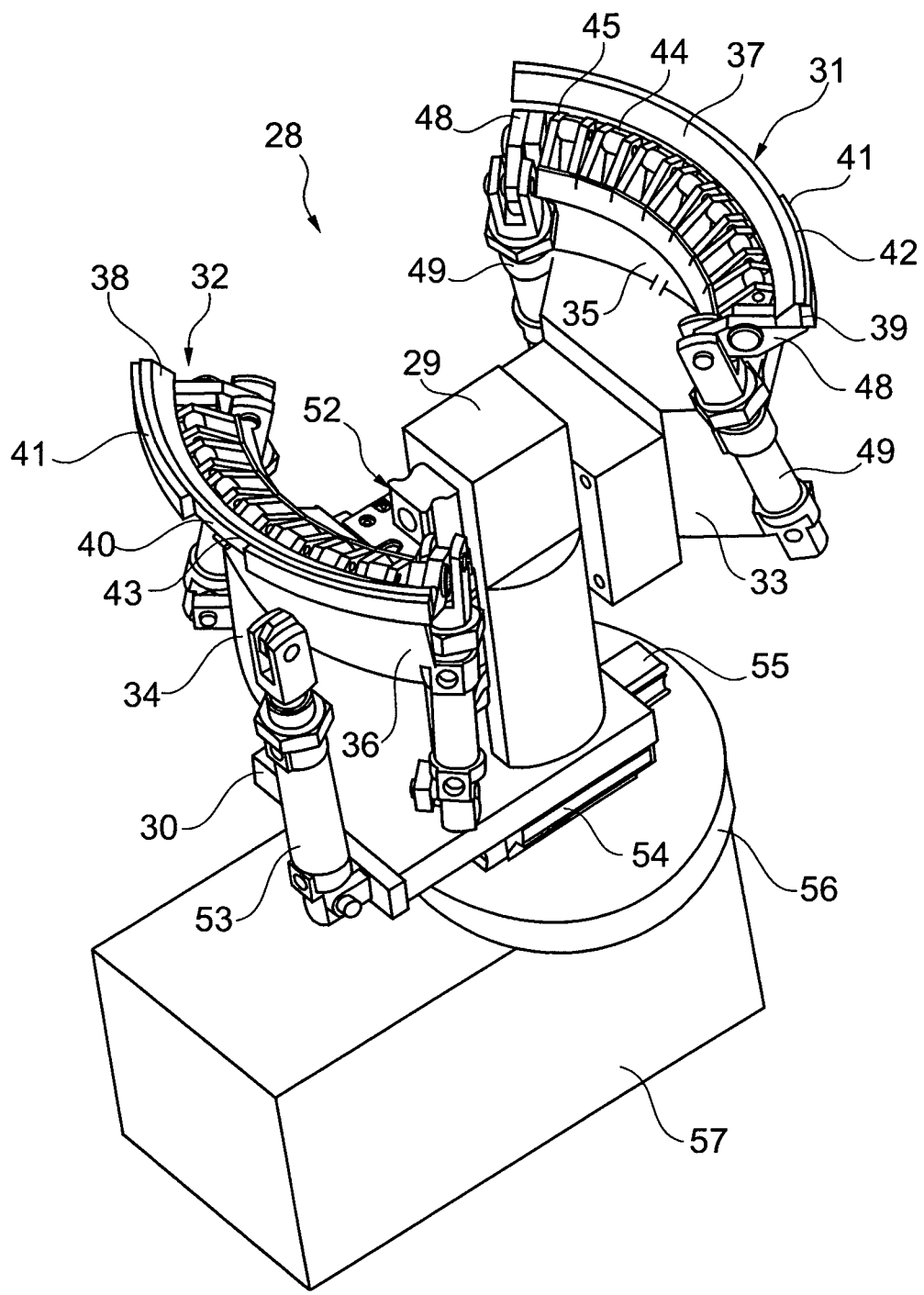
FIG. 3 is a perspective view of an applicator head of a balancing station of the invention.
Figure 4:
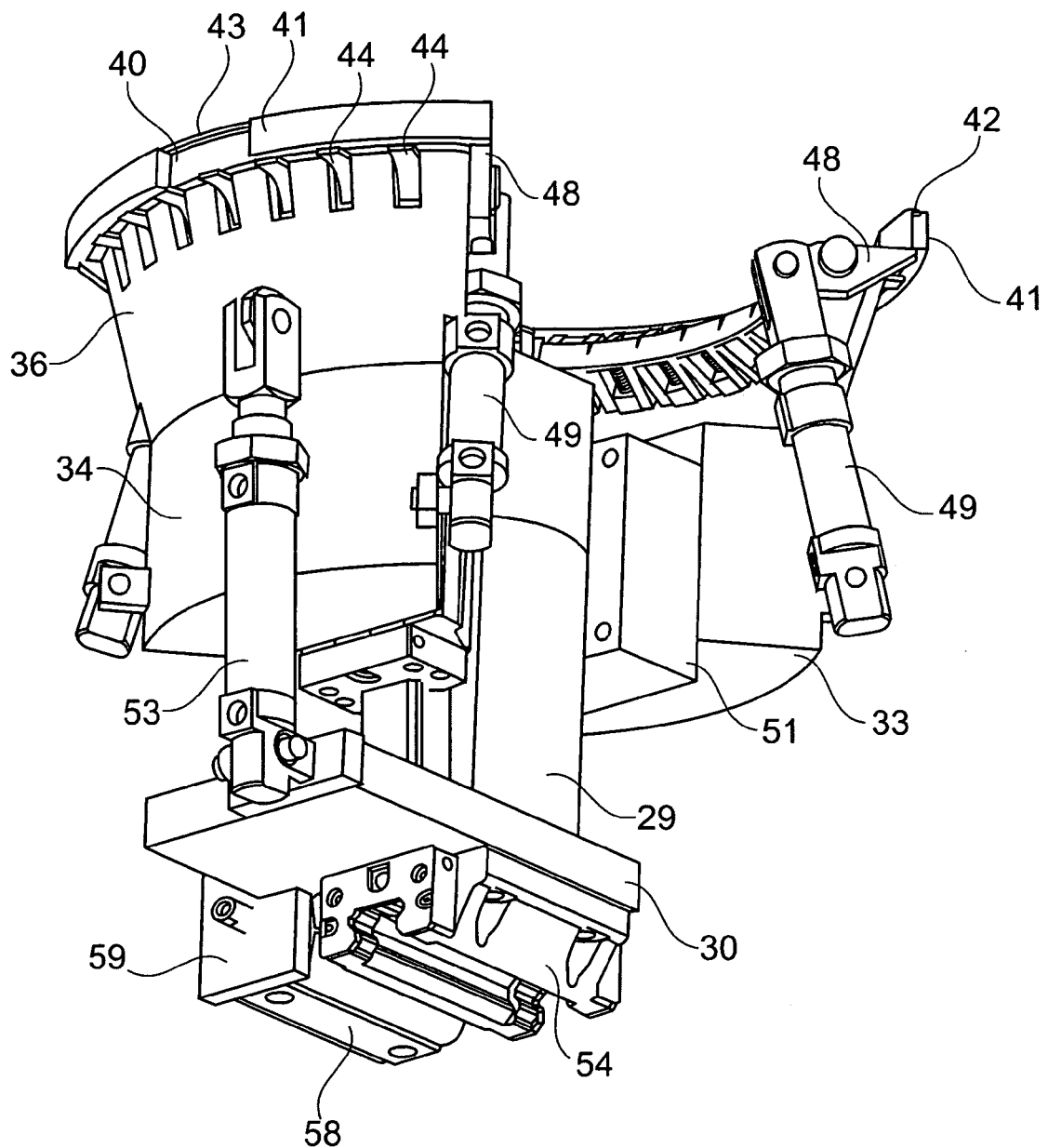
FIG. 4 is another perspective view of the applicator head of FIG. 3.
Figure 5:
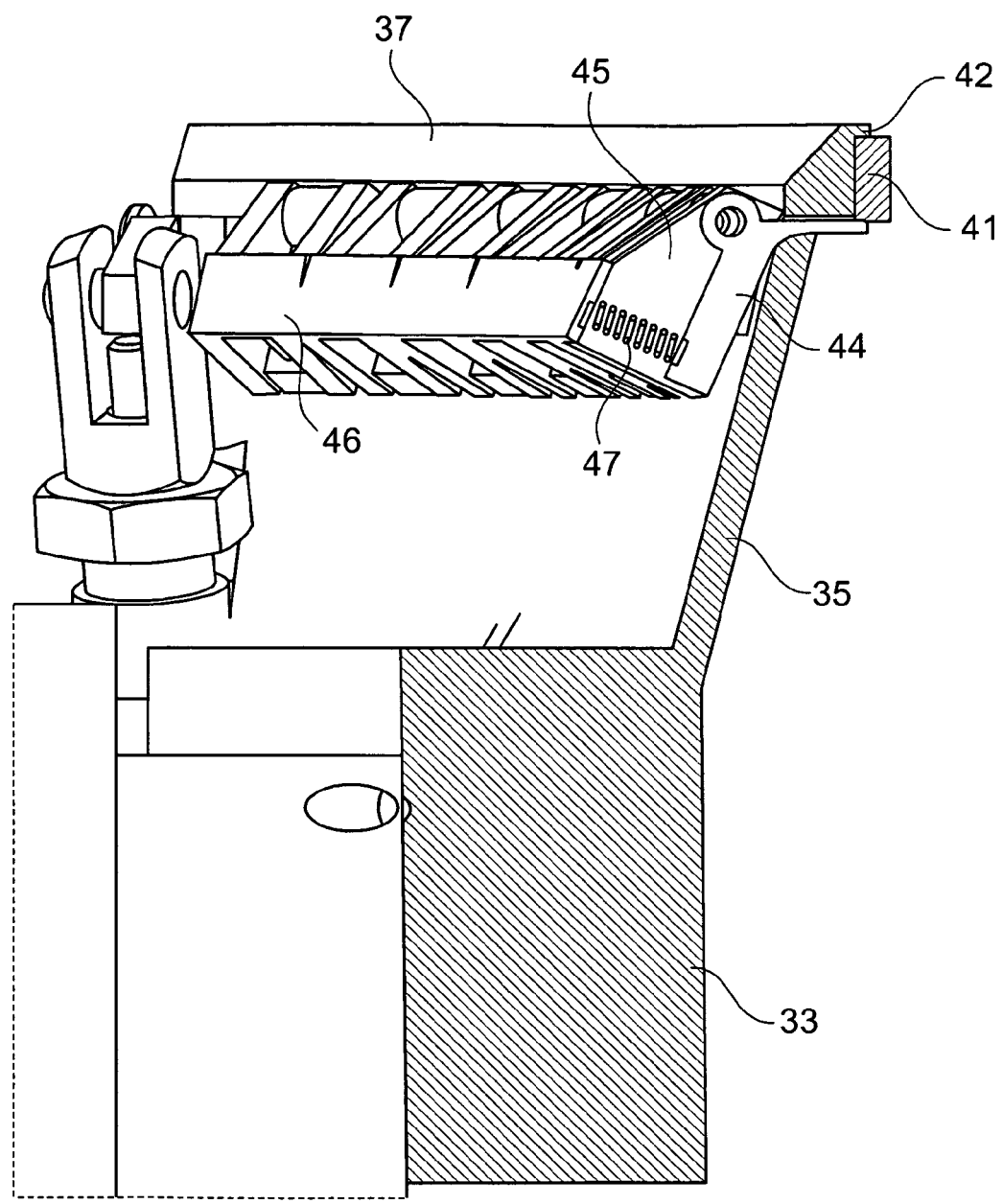
FIG. 5 is a part sectional view of the applicator head of FIG. 3.

FIGS. 3 and 4 show an applicator head 28 for the attachment of corrective elements to an essentially cylindrical inner surface of the rim of a vehicle wheel. The applicator head 28 includes a support member 29 which is secured to a base plate 30 and extends upwardly in a direction orthogonal to the base plate 30. Arranged on opposed sides on the support member 29 are two oppositely facing mounts 31, 32 for receiving corrective elements. The mounts 31, 32 have holding elements 33, 34 carrying on their sides facing away from the base plate 30 walls 35, 36 in the form of sections of a frusto-conical annular wall whose diameter increases with the distance from the holding elements 33, 34 increasing. The walls 35, 36 have at their free edges curved pressure-applying bars 37, 38 which protrude radially outwardly, forming with their outsides cylindrical engagement surfaces 39, 40 for corrective elements 41. The pressure-applying bars 37, 38 have at their upper outer edge outwardly protruding ribs 42, 43 which with their undersurface serve a lateral holding function for the corrective elements 41. Arranged at the lower edge of the pressure-applying bars 37, 38 are spring-loaded clamping fingers 44 having their ends lie opposite the ribs 42, 43. The clamping fingers 44 extend through slot-shaped openings in the walls 35, 36 and are mounted for rotation on radially aligned support plates 45 on the inside of the walls 35, 36. As becomes apparent from FIG. 5, compression springs 47 are arranged between the support plates 45 and bear against a wall 46 connecting the support plates 45. The compression springs 47 act on the clamping fingers 44 such as to urge them with their outer ends against the undersurface of the pressure-applying bars 37, 38. In this arrangement, the relative distance of the clamping fingers 44 to the ribs 42, 43 is somewhat shorter than the width of the corrective elements 41. When a corrective element 41 is inserted into the receiving area between the ribs 42, 43 and the clamping fingers 44, the ends of the clamping fingers 44 engage the side surface of the corrective element 41, whereby they are lifted clear of the pressure-applying bars 37. The spring force is then transmitted to the corrective element 41, causing it to be held clamped between the rib 42 and the clamping fingers 44.

To hold the corrective elements 41 in place, the circumferential ends of the walls 35, 36 include in addition two-armed clamping levers 48 which are movable into a clamping position and a release position by means of pneumatic reciprocating cylinders 49. The clamping levers 48 have the task during automatic loading of the corrective elements into the applicator head 28 in the open position of the clamping lever 48 to hold the starting end of a fed corrective element 41 firmly clamped by closing and to hold it securely while the corrective element 41 keeps being pressed into the clamping area between the rib 42 or 43 and the clamping fingers 44. This ensures that the corrective element 41 is not dislocated during the loading operation, occupying the correct position on the applicator head 28.

The holding element 33 is rigidly secured to the upper end of the support member 29 on the side remote from the base plate 30 by a spacer element 51. Its distance to the base plate 30 is therefore constant. The holding element 34 is held on the support member 29 for movement in the direction of the longitudinal axis of the support member 29 by a straight-line guideway 52. The relative distance of the holding element 34 to the base plate 30 is adjustable by means of a pneumatic reciprocating cylinder 53 connected to the base plate 30 and the wall 36 by joints. This movability of the holding element 34 enables the wall 36 with the pressure-applying bar 38 to be positioned and adjusted in a second correction plane in a way preventing collision with an interfering contour of the vehicle wheel during unbalance correction using the other side of the applicator head.

As becomes apparent from FIGS. 3 and 4, a carriage 54 is fastened to the underside of the base plate 30 on the side opposite the support member 29, which carriage is movably mounted on a guide rail 55, shown only in FIG. 3, parallel to the longitudinal axis of the base plate 30. The guide rail 55 is secured to a rotary table 56 which is rotatable about an axis of rotation orthogonal to the base plate by means of a rotary drive mechanism 57. Adjacent to the carriage 54 is a double-acting pneumatic reciprocating cylinder 58 which is equally secured to the rotary table 56. The piston rod of the reciprocating cylinder 58 is attached to the base plate 30 by means of a plate 59. The reciprocating cylinder 58 is movable into two end positions, enabling from the one end position the one of the two mounts 31, 32, and from the other end position the other one of the two mounts 31, 32 to be moved in the direction of the inner wall of the wheel rim in order to thereby press corrective elements 41 held on the pressure-applying bars 37, 38 against the respective attachment surface of a vehicle wheel. Alternatively, it is also possible for this pressure-applying movement to be performed by means of the handling device holding the vehicle wheel, in which case the reciprocating cylinder 58 may be used for limiting the maximum pressure force.

Figure 6:
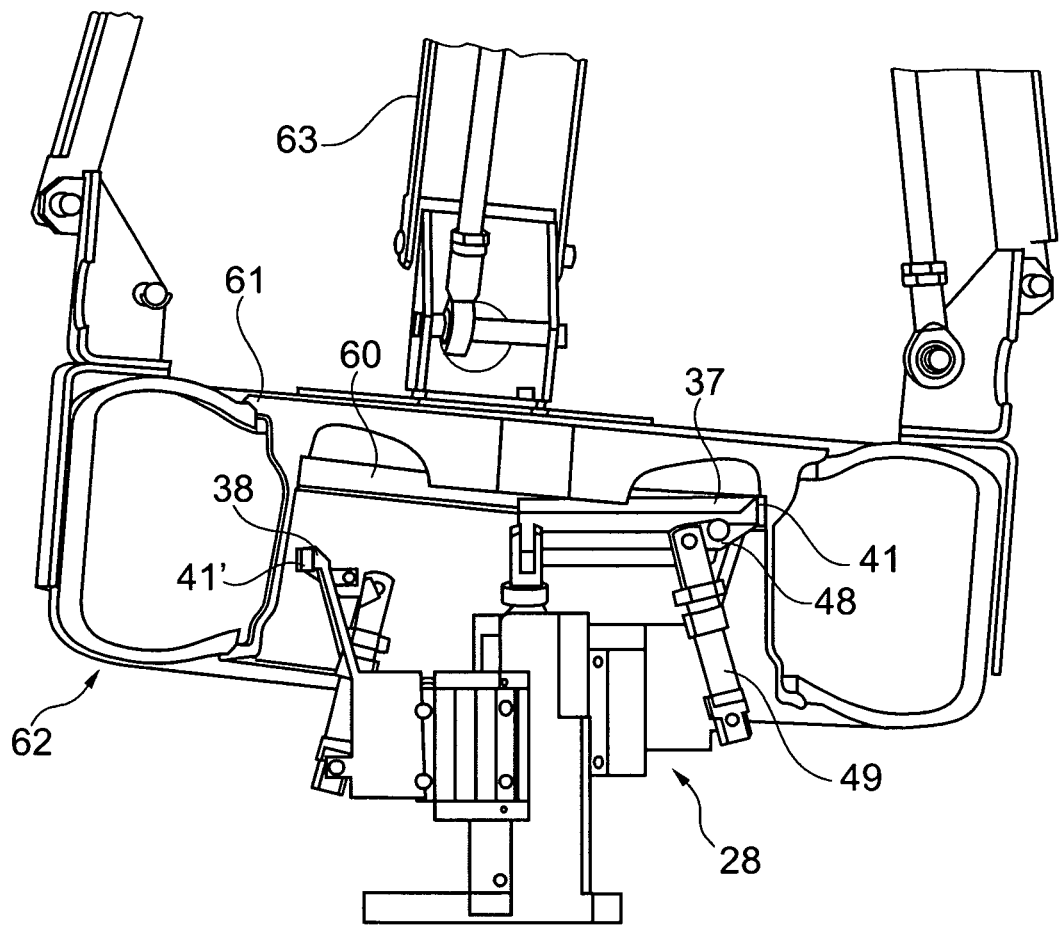
FIG. 6 shows the attachment of a corrective element to a vehicle wheel.

FIG. 6 illustrates the attachment of a corrective element 41 to an attachment surface 60 on the inside of a rim 61 of a vehicle wheel 62. The vehicle wheel 62 held by a gripper 63 of a handling device is lowered by the handling device from above down onto the applicator head 28 and positioned in such a way that the attachment surface 60 is situated at a distance of a few millimeters opposite the adhesive surface of the corrective element 41 held on the pressure-applying bar 37 of the applicator head 28. As this occurs, the applicator head 28 is already rotated into the attachment position provided for unbalance correction. Actuation of the reciprocating cylinder 58 then moves the applicator head 28 in the direction of the attachment surface 60, and the starting end of the corrective element 41 is first adhered to the rim 61. Actuation of the reciprocating cylinder 49 then releases the clamping lever 48, and a movement of the gripper 63 performed by the handling device rolls the vehicle wheel 62 with its attachment surface 60 along the adhesive surface of the corrective element 41. This process causes the corrective element 41 to be evenly pressed against the attachment surface 60 along its full length. The applicator head 28 stands still during this process, and the magnitude of the pressure force is monitored by a force sensor arranged on the applicator head 28.

Following application of the corrective element 41, the handling device moves the vehicle wheel 62 first in the radial direction for complete disengagement of the corrective element 41 from the applicator head 28. The handling device subsequently moves the vehicle wheel 62 into an appropriate position for attaching a second corrective element 41' in the second correcting plane of the vehicle wheel. After the applicator head 28 is moved to the predetermined attachment position for the second plane, the attachment process described is repeated by the second corrective element 41' arranged on the pressure-applying bar 38 being adhered.

Figure 7:
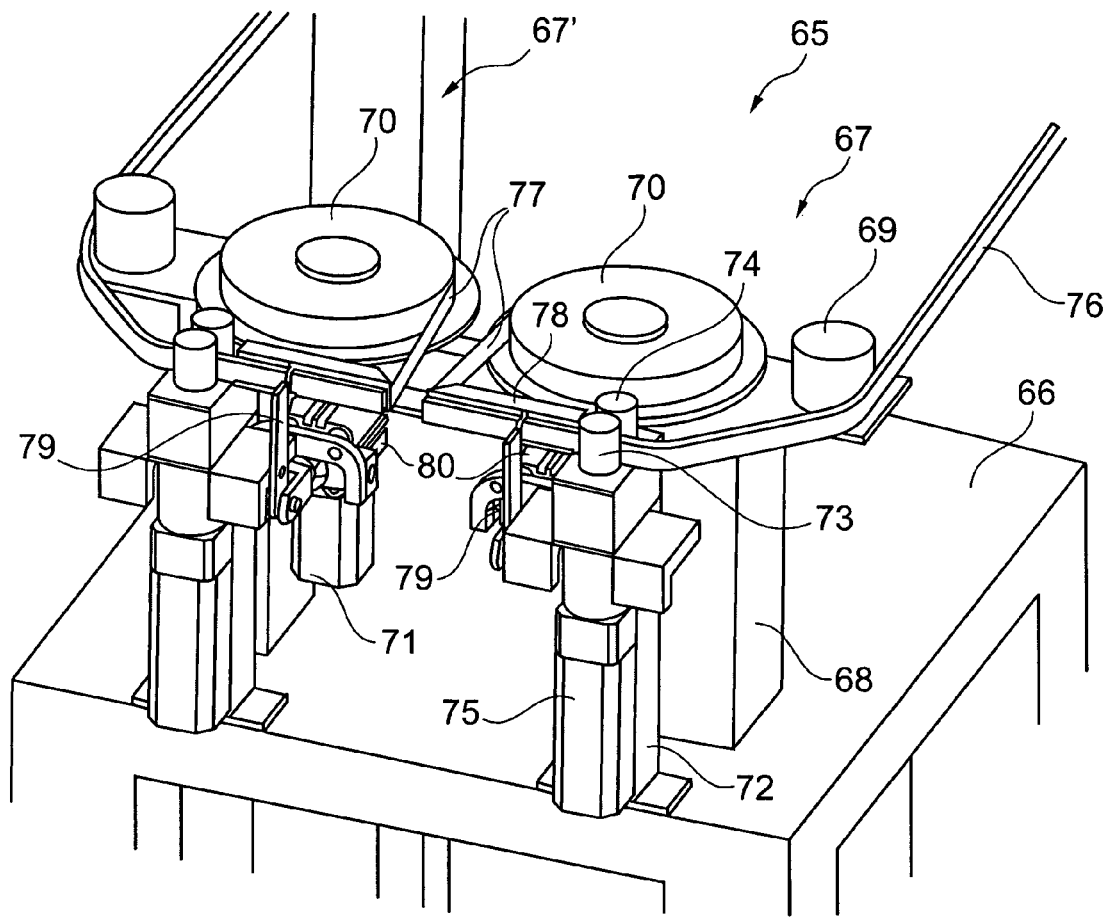
FIG. 7 is a view of a cutting device of the invention.

FIG. 7 shows an advantageous cutting device 65 of the invention intended for the manufacture of adhesive corrective elements of individual length fitted to suit the respective balancing process. The cutting device 65 includes two cutter units 67, 67' arranged side-by-side on a table 66, which cutter units are of like function, but mirror-image in construction. Each cutter unit 67, 67' has a post 68 mounting an idler pulley 69 and a take-up reel 70. The take-up reel 70 is driven by a servomotor 71. A post 72 adjacent to the post 68 includes at its upper end two parallel feed rolls 73, 74 driven by a servomotor 75 with angle-of-rotation sensor. The bearings of the feed rolls 73, 74 are spring-loaded in such a way that the feed rolls 73, 74 are forcibly pressed against a material web 76 passed between them, such that the friction produced by the pressing action is suited to unwind the material web 76 from a coil and make it pass between the feed rolls 73, 74. The material web 76 is essentially comprised of a metal strip or plastic strip of rectangular cross-section with embedded metal particles and is provided on its one wide side with an adhesive layer covered by a protective-film strip 77. Arranged on the exit side of the feed rolls 73, 44 is a guide rail 78 along which the material web 76 is guided. In front of the guide rail 78 is a parting blade 79 which is rotatably mounted on the post 72 and actuatable by a pneumatic cylinder 80.

The material web 76 unwound from a coil is placed into the cutting device 65 such as to have its protective-film strip 77 in engagement with the idler pulley 69, the feed roll 73 and the guide rail 78. The protective-film strip 77 is then routed around the end of the guide rail 78 and fastened to the take-up reel 70 for winding up. For an accurate measurement of the length of a corrective element a severing cut of the parting blade 79 produces the starting end of the corrective element to be measured. The parting blade 77 is adjusted to sever only the metal strip and not the protective-film strip 77. The length of metal strip severed by the parting cut is removed. After the starting end is cut, the feed rolls 73, 74 are rotated in the feed direction by activation of the servomotor 75 such that the angle of rotation corresponds to one circumferential length of the feed rolls 73, 74 which equals the desired length of the corrective element to be severed. At the same time, the servomotor 71 is activated to rotate the take-up reel 70 in the same sense of rotation. The starting end of the corrective element to be severed is now spaced from the parting blade 79 by a distance corresponding to the desired length of the corrective element, ready to be severed from the material web 76 by a cut of the parting blade 79. As a result of the adhesive effect between the protective-film strip 77 and the adhesive layer, the severed corrective element remains adhered to the protective-film strip 77. For transfer, the feed rolls 73, 74 are activated to move the severed corrective element with its starting end into a defined position at the exit end of the guide rail, with the protective-film strip 77 being held taut by the take-up reel 70.

To load the severed corrective element into the applicator head, the latter is moved close to the cutting device 65 and is rotated into a position enabling a starting end of the severed corrective element to be firmly clamped by means of the clamping lever 48. A subsequent rolling movement of the applicator head along the corrective element causes it to be disengaged from the protective-film strip and to be pressed completely into the receiving area between rib and clamping fingers. In this way it is ensured that the severed corrective element is transferred from the cutting device 65 to the applicator head with position accuracy and reliability.

Further corrective elements of varying length may be severed from the material web 76 one after the other in the manner described, with the parting cut for severing each preceding corrective element and the associated position of the feed rolls forming in each case the starting point for determining the feed length for the next sequential corrective element. If the next sequential corrective element is shorter than the distance between the starting end of the metal strip and the parting blade 79, the feed rolls move the material web back the necessary amount.

What is claimed is:

1. A method for correcting an unbalance on a vehicle wheel including a rim and a tire, by adhesive-bonding at least one corrective element to an attachment surface on an inside of the rim, comprising the following steps:
   measuring the unbalance of the vehicle wheel in an unbalance measuring station, and producing correction data indicative of an amount of weights and attachment locations of corrective elements relative to two correction planes, and diameters of attachment surfaces in the cavity of the rim;
   rotating the vehicle wheel in the unbalance measuring station into a defined angular position and transmitting the defined angular position and the correction data to a control device for controlling an applicator head of a balancing station, the applicator head including two mounts for receiving the corrective elements;
   transferring the vehicle wheel from the unbalance measuring station to a balancing station by means of a gripper arranged on a handling device, said gripper gripping the tire of the vehicle wheel on its outside and centrally locating and holding the vehicle wheel in the balancing station;
   loading a corrective element which has one side coated with an adhesive and exhibits the weight amount determined in the unbalance measuring station into each one of the mounts of the applicator head of the balancing station;
   axially moving the vehicle wheel and/or the applicator head and rotating the applicator head, each in dependence upon the control device, in such a way that a first corrective element in the cavity of the wheel rim reaches the first correction plane and the first attachment location on the attachment surface, and fastening the first corrective element by pressing its adhesive-coated side against an attachment surface of the rim;
   axially moving the vehicle wheel and/or the applicator head and rotating the applicator head, each in dependence upon the control device, in such a way that the second corrective element reaches the attachment location in the second correction plane where it is attached by being pressed against the vehicle wheel, and
   transferring the balanced vehicle wheel from the balancing station to an outgoing conveyor unit for further transportation and handing-over the balanced vehicle wheel to the outgoing conveyor unit by the gripper on the handling device.

2. The method according to claim 1, wherein the two mounts for receiving the corrective elements are axially spaced from each other by a distance corresponding to the relative distance of the correction planes.

3. The method according to claim 1, wherein for unbalance correction a first balancing station with a first applicator head and a second balancing station with a second applicator head are used, wherein vehicle wheels to be balanced are transferred by the handling device in a continuous sequence alternately to the first and to the second balancing station and held in the respective balancing station during the balancing operation.

4. The method according to claim 1, wherein the balancing station contains an assortment of corrective elements of different amounts of weight, an operator using the correction data to load at least one corrective elements intended for balancing into the applicator head which is moved into a loading position in the operator's secure working area.

5. The method according to claim 1, wherein the balancing station is equipped with an automatic cutting device which, in dependence upon the correction data, severs suitable corrective elements from a material web, and wherein the applicator head is moved up to the cutting device in a loading position for receiving a severed corrective element and for subsequent movement into the attaching position.

6. The method according to claim 1, further comprising the steps of transferring the vehicle wheel from the unbalance measuring station to a transfer station while maintaining its defined angular position, centrally locating it in the transfer station and gripping it centrally by means of the gripper arranged on the handling device, and then transferring it from the transfer station to the balancing station.

7. The method according to claim 1, wherein the gripper of the handling device, in transferring the vehicle wheel to the balancing station, performs a linear movement while the defined angular position is maintained.

8. The method according to claim 1, wherein the handling device, in transferring the vehicle wheel to the balancing station, performs a rotary movement about a vertical axis, and that the rotation angle of the rotary movement is detected by the control device and used for computation of the location of the defined angular position in the balancing station.

9. A device for correcting an unbalance on a vehicle wheel including a rim and a tire, by adhesive-bonding at least one corrective element to an attachment surface on an inside of the rim, with an unbalance measuring station for measuring the unbalance of the vehicle wheel and for generating correction data indicative of an amount of weight and an attachment location of at least one corrective element relative to at least one correction plane and a diameter of an attachment surface on the hollow inside of the wheel rim, with a handling device mounting a gripper for transferring the measured vehicle wheel to a balancing station, said gripper being configured for gripping the tire of the vehicle wheel on its outside, and said handling device being configured for centrally locating and holding the vehicle wheel by said gripper in the balancing station, and with a device for transmitting the defined angular position and the correction data to a control device for controlling the balancing station, said balancing station including an applicator head having at least one mount for receiving at least one corrective element, said applicator head being dimensioned to be able to enter into the cavity of the wheel rim, and said applicator head being rotatable about an axis into any attachment position on the attachment surface by means of a rotary drive mechanism controllable by the control device, wherein a first mount for receiving at least one corrective element is arranged on a support member of the applicator head, and a second mount for receiving at least one corrective element is arranged on the opposite side relative to the axis of the first mount.

10. The device according to claim 9, wherein the applicator head includes a pressure-applying device actuatable by the control device for pressing the corrective elements against the attachment surface of the wheel rim.

11. The device according to claim 9, wherein the mount of the applicator head is carried on a support member by means of a straight-line guideway and movable along the straight-line guideway by a controllable actuator, and that said straight-line guideway is aligned parallel to the axis of the applicator head.

12. The device according to claim 9, wherein the applicator head is movable transverse to its axis back and forth between an attaching position and a loading position by a translatory actuator.

13. The device according to claim 9, wherein the applicator head is disposed on a carriage, which is movable by a controllable actuator along a guide rail extending transverse to the axis of the applicator head.

14. The device according to claim 9, wherein the mount of the applicator head includes a curved wall with an edge area curved in a circular configuration and extending at a constant distance to the axis, with several radially aligned support plates being fastened to the inside of the edge area, said plates mounting for pivotal movement resilient clamping fingers, wherein a curved pressure-applying bar is arranged on the outside of the support plates facing away from the axis, said bar having on its outside a cylindrical engagement surface and adjacent thereto an outwardly projecting rib, and wherein the clamping fingers have their ends protrude outwardly beyond the curved pressure-applying bar such that their ends lie opposite the rib.

15. The device according to claim 9, wherein at one circumferential end of the curved pressure-applying bar, a two-armed clamping lever is arranged which with one clamping end thereof lies opposite an outwardly projecting rib of the pressure-applying bar and is movable by a controllable reciprocating cylinder into a clamping position holding a corrective element and into a release position.

16. The device according claim 9, further comprising a transfer station which is connected to the unbalance measuring station by a conveying device constructed to transfer a vehicle wheel from the unbalance measuring station to the transfer station without changing its angular position.

17. The device according to claim 9, further comprising an automatic cutting device with a feeding unit for a material web, a severing unit which in dependence upon the correction data severs suitable corrective elements from the material web, and by a controllable motion device by means of which the applicator head is movable up to the cutting device for the insertion of severed corrective elements.

* * * * *